(12) United States Patent
Takahashi et al.

(10) Patent No.: US 6,893,134 B2
(45) Date of Patent: *May 17, 2005

(54) PLANAR LIGHT EMITTING DEVICE

(75) Inventors: Toshinori Takahashi, Konan (JP); Norihito Kino, Aichi-ken (JP); Makoto Tamaki, Bisai (JP); Tadanobu Iwasa, Ichinomiya (JP); Hiroshi Sugihara, Ogaki (JP); Osamu Yamanaka, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/032,575

(22) Filed: Jan. 2, 2002

(65) Prior Publication Data

US 2002/0051356 A1 May 2, 2002

Related U.S. Application Data

(62) Division of application No. 09/309,279, filed on May 11, 1999.

(30) Foreign Application Priority Data

May 11, 1998 (JP) ............................................ 10-126922
May 22, 1998 (JP) ............................................ 10-141969

(51) Int. Cl.[7] ................................................ F21V 8/00
(52) U.S. Cl. .......................................... 362/31; 362/812
(58) Field of Search .............................. 362/26, 27, 31, 362/97, 331, 812, 23; 40/546, 564, 577, 615

(56) References Cited

U.S. PATENT DOCUMENTS

| | | | | |
|---|---|---|---|---|
| 2,821,799 A | * | 2/1958 | Partridge | 40/546 |
| 3,018,107 A | * | 1/1962 | Erikson | 362/97 |
| 5,678,334 A | * | 10/1997 | Schoniger | 40/546 |

* cited by examiner

Primary Examiner—Y. My Quach-Lee
(74) Attorney, Agent, or Firm—McGinn & Gibb, PLLC

(57) ABSTRACT

A planar light emitting device has a planar light emitter. It has a layered structure composed of a transparent body and a semi-transparent body. The transparent body is made of a transparent synthetic resin containing no light scattering material. The semi-transparent body is made of a semi-transparent synthetic resin containing a light scattering material. The transparent body and the semi-transparent body are joined to form a diffusion layer therebetween. An LED array is disposed at one side of the planar light emitter. The diffusion layer has a sea-islands structure. An island resin has a dimension of 0.1 to 50 microns. The light entering the island resin attenuates therein without reflecting at once due to its complicated shape. Namely, the light entering the diffusion layer generates uniform brightness.

2 Claims, 11 Drawing Sheets

11  14  12  15  13

PLANAR LIGHT EMITTING DEVICE

This is a Divisional Application of U.S. application Ser. No. 09/309,279, filed May 11, 1999, the contents of which are incorporated herein by reference.

BACKGROUND OF THE INVENTION

1. Field of the Invention

This invention relates to a planar light emitting device having a built-in light source, e.g. a light emitting diode (LED) or the like. The planar light emitting device is used as a table, sign rod or pole, backlight device for liquid crystal panel or display board, etc. It is also applicable to a vehicle meter such as a speedometer or tachometer of an automobile. Particularly, it is preferably applied to a vehicle meter that uses an LED to light up a scale, pointer or the like.

2. Description of the Related Art

A planar light emitting device is used as a sign pole and practiced into a traffic control tool having a red synthetic resin tube fitted on an end of a torch or flashlight. Such control tool turns on or flashes on and off the light to indicate that traffic is being controlled.

A planar light emitting device is also used for a display board and has a backlight device. The backlight device has a fluorescent lamp of low power consumption arranged at the back of a liquid crystal panel. The light from the fluorescent lamp is guided to the rear side of the LC panel via a synthetic resin board or glass board as a prism. However, it is impossible to obtain uniform luminous intensity distribution with the prism alone. Therefore, under the present conditions, a plurality of fluorescent lamps is disposed to get a uniform luminous intensity distribution.

A display panel such as a billboard or a display board has a fluorescent lamp at the back of a synthetic resin board of milky color. The light from the fluorescent lamp is guided to the resin board and illuminates a film disposed on the surface thereof. However, with the light of the fluorescent lamp, it is impossible to obtain uniform luminous intensity distribution with the milky resin board alone. Therefore, under the present conditions, a plurality of fluorescent lamps is disposed to get a uniform luminous intensity distribution, too. Moreover, in case of using the fluorescent lamp, it is hard to small-size the display board.

With respect to the planar light emitting device in the shape of the traffic control tool, decorative features are rarely sought in its indicator mode. Therefore, the use if restricted to the traffic control or hazard sign.

With respect to the backlight device for the display board, since plural fluorescent lamps are arranged at the back of the prism or milky resin board to make the luminous intensity uniform, the device must be large-sized. Particularly, in case the device is small-sized, the prism board of resin or glass should be mixed with a diffusing material. Then, the luminous intensity should be controlled by both the diffusing material and prism. However, in such backlight device, if a dimension and shape is changed, total design needs to be modified accordingly, thereby to increase costs. Moreover, such structure is applicable to a planar light emitter. However, it is difficult to manufacture a light emitter provided on a periphery of a rod such as the traffic control tool.

A conventional planar light emitting device with the above-mentioned structure is disclosed in Japanese Patent Publications (Kokai) No. 5-249319 and No. 6-347617.

However, a technique shown in either publication relates to a diffused light conductor having a board shape, and a scattering material is mixed in the light conductor. Consequently, attenuation factor becomes large according to a distance from a light source. Thus, it is difficult to obtain a uniform light emitting surface. For example, the publication No. 5-240319 discloses a technique to form the light conductor in a ridge shape so as to compensate the attenuation by the distance from the light source. However, it is actually hard to make uniform the luminous intensity distribution in a large area.

Generally, a magnetic type is used for a speedometer as an example of a conventional vehicle meter. The speedometer has a scale plate or dial, a pointer and a drive unit to rotate the pointer for speed indication. Namely, the pointer indicates a vehicle speed on a scale of the scale plate.

On the other hand, the vehicle meter such as the speedometer not only acts to transmit a man-machine information like the car speed, but also functions as a component of an interior of the vehicle. Then, the vehicle meter occupies a main portion of an instrument panel that is a part attracting the most attention of a driver or the like. Its design or ornamentation is important. Therefore, in recent years, many attempts are made to improve a mechanism of each kind of meter itself, an arrangement and the like, in view of diversified tastes and sensibility of users.

Moreover, it is preferable to position the vehicle meter as distant as possible from eyes of the driver, in consideration of farsightedness of middle or old aged people.

However, the conventional vehicle meter has a complicated mechanical structure, so that wear of mechanical parts should be considered in use. Thus, there is plenty of room for improvement in respect of maintenance, accuracy in indication and so on. Moreover, the design of the conventional vehicle meter is determined at the time of manufacture and cannot be changed afterwards according to the tastes of the users. Therefore, the diversified tastes of the users cannot be satisfied with the conventional design, which has the scale plate and pointer as the mechanical components. Thus, there is a room for improvement in design.

In addition, the conventional vehicle meter needs a large space for the drive mechanism. Then, it requires a considerable depth in a meter panel and cannot be thin. The design of the meter panel is limited accordingly, and there is a room for improvement in an aesthetic point.

BRIEF SUMMARY OF THE INVENTION

An object of the present invention is to provide a planar light emitting device that can obtain a uniform luminous intensity distribution even on a complex surface as well as a flat surface, and that can be easily thinned.

Moreover, another object of the present invention is to provide a planar light emitting device that makes uniform diffusion of light guided from an LED and that has much possibility to diversify a design.

A planar light emitting device according to a first aspect of the invention comprises a transparent body made of a transparent synthetic resin layer containing no light scattering material and a semi-transparent body made of a semi-transparent synthetic resin layer containing a light scattering material. A diffusion layer is formed between the transparent body and the semi-transparent body by joining the transparent body and the semi-transparent body. The diffusion layer has a sea-islands structure composed of a sea and a multiplicity of islands of irregular solid shapes provided on the sea in plan view. At least the transparent body, the semi-transparent body and the diffusion layer define a planar light emitter. A light source is disposed at least at one side of the planar light emitter.

For example, the planar light emitter has a flat plate shape and comprises two or more layers of the transparent bodies. The semi-transparent body is interposed between the transparent bodies.

For example, the planar light emitter has a flat plate shape and comprises three or more layers of the transparent bodies and two or more layers of the semi-transparent bodies. The semi-transparent bodies are interposed between the transparent bodies, respectively, thereby providing three or more of the diffusion layers.

For example, the planar light emitting device is disposed on a top board of a table, thereby forming the table.

In this case, for example, the planar light emitter comprises at least two layers of the transparent bodies and the semi-transparent body interposed between the transparent bodies. The transparent bodies are disposed on an upper surface and a lower surface of the top board, respectively, so as to illuminate an upper side and a lower side of the top board.

For example, the planar light emitter has a rod shape and comprises the semi-transparent body at least at a portion of a cross section thereof. The diffusion layer exists at least at the portion.

The light source is preferably made of an LED.

For example, an element of a meter may be composed of the planar light emitting device, thereby forming a vehicle meter.

In this case, for example, the element of the meter comprises a pointer.

Moreover, for example, the element of the meter comprises a dial.

Furthermore, for example, the element of the meter comprises a pointer and a dial.

In addition, the LED may comprise two or more colors of LEDs so as to control a light emitted from the element of the meter into a plurality of colors.

For example, a side step for a vehicle may be formed of the planar light emitting device.

In this case, the planar light emitter has an elongate rectangular flat plate shape so as to form a main part of the side step. The transparent body is disposed on one thickness side of the side step so as to illuminate a lower side of a door of the vehicle.

For example, a sound illumination device may be formed of the planar light emitting device.

In this case, the planar light emitter has a ring plate shape. The LED is controlled to emit light in accordance with sounds of a speaker so as to illuminate the planar light emitter.

For example, a stick lamp may be formed of the planar light emitting device.

In this case, the transparent body has a tubular shape so as to be disposed on an outer periphery. The semi-transparent body is filled in the transparent body.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
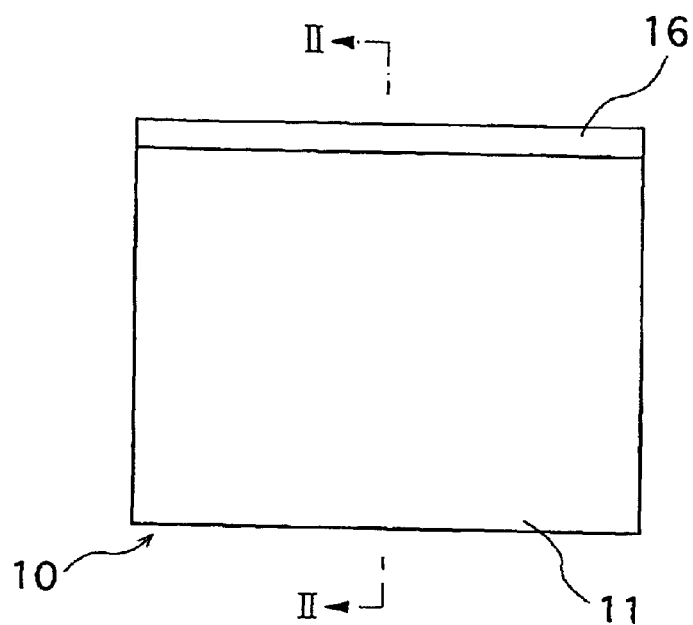
FIG. 1 is a plan view showing an overall structure of a planar light emitting device according to a first embodiment of the invention.

Several embodiments of the invention are described hereunder referring to the attached drawings. The same reference character is attached to the same element throughout the several embodiments, to avoid redundancy.

Figure 2:
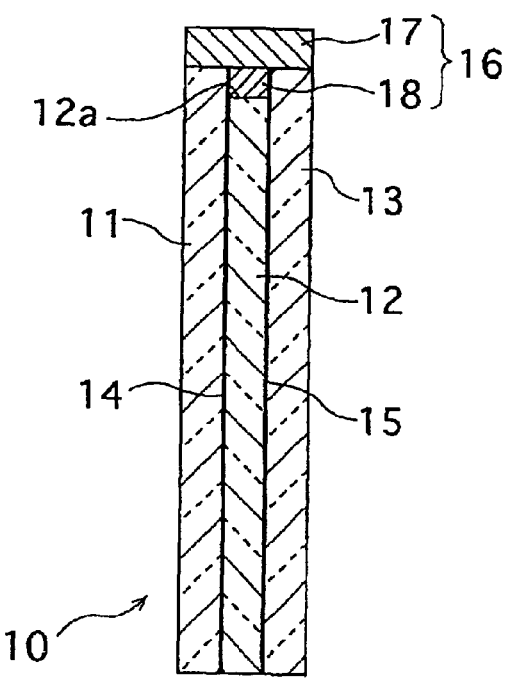
FIG. 2 is a cross sectional view taken along the line II—II of FIG. 1.

FIG. 1 illustrates an overall structure of a planar light emitting device according to a first embodiment of the invention. FIG. 2 shows the planar light emitting device, while cutting it along the line II—II of FIG. 1.

The light emitting device of the first embodiment is practiced into a light emitter 10 that is applicable to a backlight device. Referring to FIG. 1 and FIG. 2, the light emitter 10 is shaped into a rectangular flat plate as a whole. The planar light emitter 10 has a three-layered light emitting portion composed of a transparent layer 11, semi-transparent layer 12 and transparent layer 13. An LED array 16 is fixed along full length of one lateral end of the light emitting portion 11–13, which has a rectangular flat plate shape. The LED array 16 is composed of a printed board 17 of an elongate plate shape and an LED chip array 18. The LED chip array 18 has many LED chips mounted on the printed board 17 at fixed intervals along its length. The LED chip array 18 is arranged opposite to the semi-transparent layer 12. Accordingly, the semi-transparent layer 12 is dented inwards a little corresponding to the LED chip array 18, at a portion where the LED chip array 18 is disposed. The LED chip array 18 is accommodated in such dent 12a while closely contacted therewith.

The transparent layers 11 and 13 may be made of a thermoplastic resin formed into a rectangular flat plate approximately 2 mm thick. The transparent layer 11, 13 consists of a light-transmitting material containing no light scattering material. Namely, it is composed of the transparent thermoplastic resin alone. For such thermoplastic resin, the followings are usable: acrylic resin, PMMA (polymethyl methacrylate), polystyrene, AS resin, polycarbonate, and acrylic styrene monomer copolymer. A transparent thermosetting resin such as epoxy resin or urethane resin may be used in place of the transparent thermoplastic resin. The semi-transparent layer 12 may be made of a thermoplastic resin formed into a rectangular flat plate approximately 2 mm thick. The semi-transparent layer 12 is a translucent resin layer containing a light scattering material mixed in a transparent thermoplastic resin. A similar thermoplastic resin to that of the transparent layer 11 can be used for such thermoplastic resin. The material for the semi-transparent body 12 may be made by mixing the transparent resin used for the transparent body 11 with the scattering material made of a transparent resin such as a silica or silicone. In this case, the refractive index varies depending on the material or medium of both the transparent resins. Thus, the semi-transparent body 12 looks like translucent. As in the case of the transparent layer 11, 13, the thermoplastic resin may be replaced by a thermosetting resin containing the light scattering material to form the semi-transparent layer 12. Namely, the transparent layer 11, 13 and semi-transparent layer 12 can be made of the thermosetting resin instead of the thermoplastic resin, as long as it performs similar function.

The light emitting portion 11 to 13 of the present embodiment is manufactured as follows, for example. First, the transparent layers 11 and 13 are formed of the transparent resin material. Then, they are disposed opposite and parallel to each other with a fixed space. Next, a melted translucent resin material containing the light scattering material is pored into the space between them. Thereafter, it is cooled, thereby forming the semi-transparent layer 12. Thus, the semi-transparent layer 12 is integrally molded and joined between the transparent layers 11 and 13.

The semi-transparent layer 12 may be formed first, then the transparent layers 11 and 13 may be integrally joined by fusion to both thickness sides of the semi-transparent layer 12. Otherwise, the transparent layers 11 and 13 and semi-transparent layer 12 may be formed individually, then they may be joined integrally by an adhesive.

Figure 3:
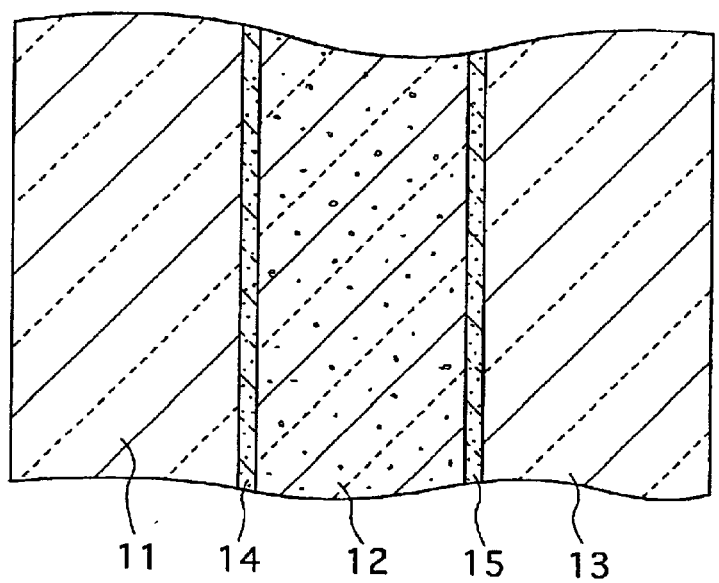
FIG. 3 is an enlarged cross sectional view of a main portion to schematically show a transparent body, semi-transparent body and diffusion layer of the planar light emitting device according to the first embodiment of the invention.

FIG. 3 schematically shows the transparent body, semi-transparent body and diffusion layer of the planar light emitting device according to the first embodiment of the invention.

As mentioned above, the semi-transparent body or layer 12 is made of the thermoplastic resin containing the light scattering material and packed as a filler between the transparent bodies or layers 11 and 13 made of the thermoplastic resin. In this case, diffusion layers 14 and 15 are formed at an interface when integrating both the resins. Namely, no matter which of the transparent layer 11, 13 and the semi-transparent layer 12 is molded first, the diffusion layers 14 and 15 are formed at the interface when unifying both the resins. It is the same whether both the resins are joined by fusion or by adhesion. It is deduced that this is because the transparent thermoplastic resin and the translucent thermoplastic resin with the light scattering material form a layer of a sea-islands structure described later, at the interface when integrated. Then, it is deduced that the sea-islands structure forms the diffusion layer 14, 15. Therefore, an object of the semi-transparent layer 12 used herein is to provide the diffusion layer 14, 15 at the interface when integrating both the resins. Consequently, it is enough to mix the light scattering material as less as possible, if it is possible to form the sea-islands structure at the interface.

FIG. 3 illustrates the diffusion layer 14, 15 as a different layer from the transparent layer 11, 13 and semi-transparent layer 12, so that a boundary surface line exists between the transparent layer 11, 13 and the semi-transparent layer 12. However, actually, the sea-islands structure is formed at the boundary surface or interface between the transparent layer 11, 13 and the semi-transparent layer 12, thereby defining a layer structure. Therefore, no clear boundary surface is formed between the diffusion layer 14, 15, the transparent layer 11, 13 and semi-transparent layer 12.

Figure 4:
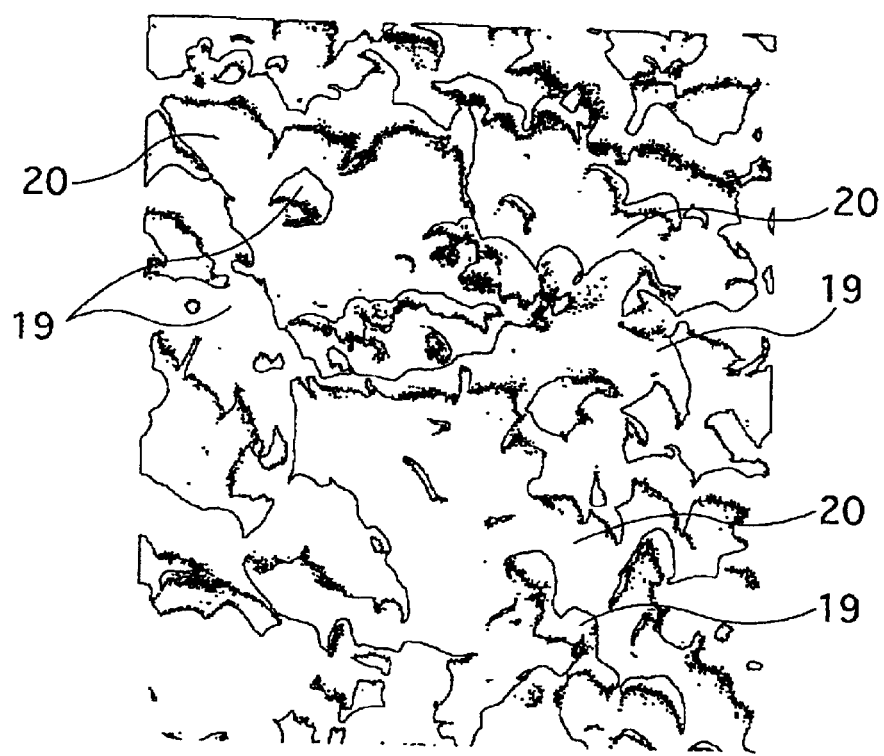
FIG. 4 is an enlarged plan view schematically showing the diffusion layer of the planar light emitting device according to the first embodiment of the invention.

FIG. 4 schematically shows the diffusion layer of the planar light emitting device according to the first embodiment of the invention.

Referring to FIG. 4, the diffusion layer 14, 15 has the sea-islands structure when seen in plan view. Namely, the diffusion layer 14, 15 has a structure in which there are floated many resins or particles 19 in the shape of islands having irregular and complicated solid shape on a sea 20. A thickness of the diffusion layer 14, 15 changes depending on the material of the transparent layer 11, 13 and semi-transparent layer 12 and a temperature at which they are integrated. Generally, it has a thickness of approximately a few microns to 70 microns. The resin 19 defining the island of the diffusion layer 14, 15 has a dimension of approximately 0.1 to 50 microns. The islands 19 are uniformly arranged on an entire surface of the transparent layer 11, 13, that is, an entire outside surface of the semi-transparent layer 12. In the diffusion layer 14, 15, the particle 19 as the island resin has a particle size of approximately 0.1 to 50 microns and is formed with many branches of irregular shapes. The branches get into the transparent layers 11 and 13.

In the present embodiment, the diffusion layer 14, 15 uniformly diffuses the light from the LED chip array 18 by the sea-islands structure. The diffused light is radiated from the entire outside surface of the transparent layer 11, 13. Thus, the outside surface as one surface of the transparent layer 11, i.e. a left side of FIG. 2, and the outside surface as the other surface of the transparent layer 13, i.e. a right side of FIG. 2, define light radiating surfaces that radiate the diffused light from the diffusion layers 14 and 15 to the outside.

Figure 5:
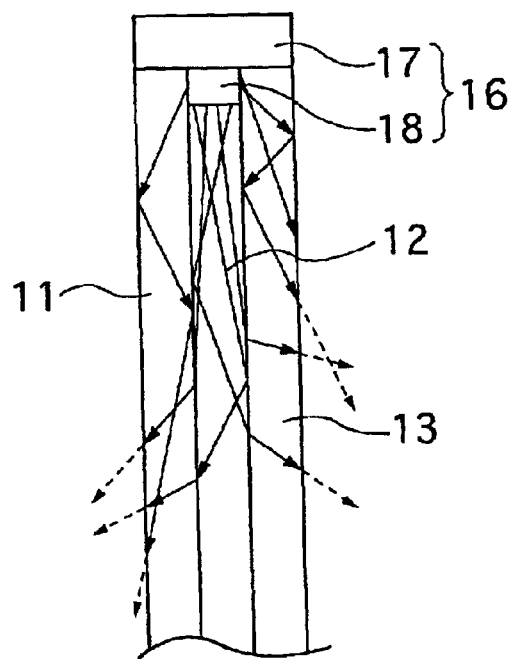
FIG. 5 is an enlarged cross sectional view showing light radiation in the planar light emitting device according to the first embodiment of the invention.

FIG. 5 shows light radiation in the planar light emitting device according to the first embodiment of the invention.

As described above, the LED array 16 is disposed integrally at the end of the semi-transparent layer 12. The LED chip array 18 of the LED array 16 is constituted by mounting red, green and blue LED chips one after another and successively in a line on the printed board 17. Particularly, in the first embodiment, the LED chip array 18 is connected to the semi-transparent layer 12 by an adhesive when fitting the LED chip array 18 in the dent 12a. Thus, reflection at the end surface of the semi-transparent layer 12 is prevented as much as possible.

Of course, the planar light emitting device of the first embodiment can be manufactured by another method. For example, to begin with, the transparent bodies 11 and 13 are disposed side by side. Next, the printed board 17 is connected to the end of the transparent bodies 11 and 13 so that the LED chip array 18 is interposed between the transparent bodies 11 and 13. Finally, the semi-transparent body 12 is filled between them as a filler or packing material. In this case, it is unnecessary to connect the LED chip array 18 and the semi-transparent body 12 by an adhesive. Moreover, it improves light incidence efficiency in the semi-transparent body 12.

Three primary colors of LED chip array 18 is preferably joined to the end of the semi-transparent body 12 by an adhesive having the same refractive index as the semi-transparent body 12. In this case, the light of the LED chip array 18 goes into the semi-transparent body 12 without reflection at the end surface thereof. Thus, the light from the LED chip array 18 can be efficiently guided to the semi-transparent body 12. Part of the light does not go into the semi-transparent body 12 from the end surface thereof, but goes into the transparent bodies 11 and 13. Namely, as shown in FIG. 5, the light of the LED chip array 18 is radiated into the transparent bodies 11 and 13 from the lateral side surfaces of the array 18 and into the semi-transparent body 12 from the thickness side surface of the array 18.

While the LED chip array 18 is put between the transparent bodies 11 and 13 in the present embodiment, one or plural LED lamps may be disposed instead of the LED chip array 18. Every color of chip LEDs of the LED chip array 18 may be optionally arranged in a desired order. Each color of LED may be lined up one by one or in plurality over and over. It is possible that no dent is provided at the inner end of the semi-transparent body 12, but that the inner end surface thereof is flush with the inner end surfaces of the transparent bodies 11 and 13.

The above-structured planar light emitting device of the first embodiment operates as follows.

First, when the LED array 16 is driven, the most part of the light emitted from the LED chip array 18 goes into the semi-transparent body 12. The other part of the light goes into the transparent bodies 11 and 13.

At this time, as shown in FIG. 5, the light transmitted in the semi-transparent body 12 and the light transmitted in the transparent bodies 11 and 13 are reflected while diffused at the diffusion layers 14 and 15, respectively. Part of the light from the semi-transparent body 12 goes into the islands or particles 19 of the diffusion layer 14, 15. Then, such light is not reflected at the surface of the particle 19 directly towards the semi-transparent body 12 due to its complex solid shape. The light is reflected repeatedly inside the particle 19 to illuminate it, thereby attenuating inside the particle 19. The light from the semi-transparent body 12 is reflected only at the sea 20 of the diffusion layer 14, 15. Thus, only such reflected light is returned into the semi-transparent body 12. Namely, once the light enters the semi-transparent body 12, it attenuates therein. As a result, the light entering the island resin 19 makes the diffusion layer 14, 15 bright. Consequently, the diffusion layer 14, 15 is prevented from becoming partially bright and appearing locally shining. Therefore, the planar light emitter 10 sends out the light uniformly from the whole outside surface. Moreover, the light seen from the outside is not the one radiated from the outside surfaces of the transparent bodies 11 and 13, but the one generated at the diffusion layers 14 and 15. Thus, there is obtained a profound light emission.

In this embodiment, three primary colors of chip LEDs are used for the LED chip array 18 so as to emit a white light from the entire surface of the light emitter 10 and to output any color of light as desired. However, the LED array 16 may be composed of a single color LED or desired plural colors of LEDs. Moreover, the LED array 16 may be constituted of one or more LED lamps or chip LEDs.

As mentioned above, the light entering the semi-transparent body 12 and transparent bodies 11 and 13 has even brightness at the diffusion layers 14 and 15. The inventors confirmed that the diffusion layer 14, 15 had its entire surface uniformly illuminated regardless of the distance from the light emitting source. Moreover, the inventors confirmed that, even if the semi-transparent body 12 was thicker at the side of the LED chip array 18, there was no substantial change in the emitted light distribution of the light emitter 10. Namely, the luminous intensity distribution became uniform. Furthermore, while the whole circumference of the light emitter 10 is cut into a perpendicular flat surface in the first embodiment, it may be a curved surface. In this case, it was also confirmed that the luminous intensity distribution change was not substantial.

In this embodiment, the thickness end surface of the LED chip array 18 is faced to the lateral end surface of the semi-transparent body 12 so that the major part of the emitted light goes into the same end of the plate 12. However, it is possible to make the light from the LED chip array 18 enter the transparent body 11, semi-transparent body 12 and transparent body 13 equally at the same time. Moreover, it is also possible to make the light enter one or two of the transparent body 11, semi-transparent body 12 and transparent body 13.

The planar light emitter 10 forms the two diffusion layers 14 and 15 in total by joining the one semi-transparent body 12 and the two transparent layers 11 and 13. However, one diffusion layer may be formed by joining one transparent layer 11 and one semi-transparent layer 12. To the contrary, three or more diffusion layers may be provided as described later. If there is provided one diffusion layer, the light emitting device has a single light emission surface at the outside surface of the transparent layer 11. Such device is applicable as a backlight device of a liquid crystal display and the like and advantageous in terms of costs. If two diffusion layers 14 and 15 are provided as in the first embodiment, two transparent bodies are necessary, thereby increasing costs. Still, in this case, two emission surfaces are formed by the outer surfaces of the transparent bodies 11 and 13. Thus, there are advantageous effects that its design can be diversified and that it is applicable to a variety of uses.

Figure 6:
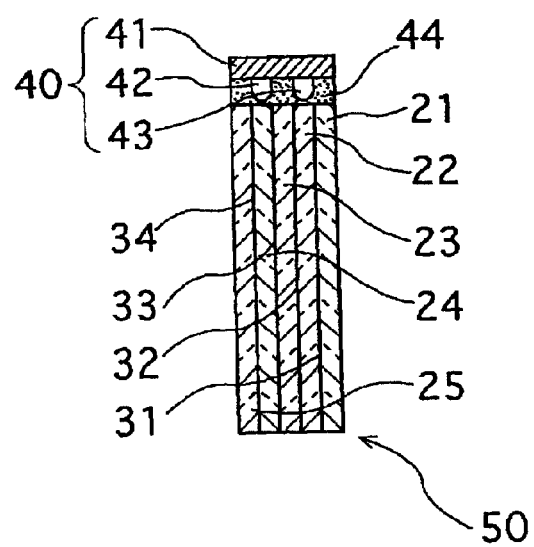
FIG. 6 is a cross sectional view showing a planar light emitting device according to a second embodiment of the invention, corresponding to the cross sectional view taken along the line II—II of FIG. 1.

FIG. 6 shows a planar light emitting device according to a second embodiment of the invention.

Referring to FIG. 6, a planar light emitter 50 has substantially the same rectangular flat plate shape as the light emitter 10 of the first embodiment. It has a light emitting portion composed of five layers. Namely, it has three transparent bodies 21, 23 and 25 and two semi-transparent bodies 22 and 24 layered one by one. Thus, four diffusion layers 31, 32, 33 and 34 are provided in total in the light emitting portion 21–25. An LED array 40 is secured to one lateral end of the light emitting portion 21–25 of rectangular plate shape along its full length.

The transparent body 21, 23, 25 may be made of a transparent synthetic resin layer that contains no light scattering material and that has a rectangular flat plate shape approximately 2 mm thick, for example. It is preferable to make the transparent bodies 21, 23 and 25 of the same material. However, they may be made of different materials as long as a transparent synthetic resin material containing no light scattering material is used. The semi-transparent body 22, 24 may be made of a semi-transparent synthetic resin layer that contains a light scattering material and that has a rectangular flat plate shape approximately 1 mm thick, for example. It is preferable to make the semi-transparent bodies 22 and 24 of the same material. However, they may be made of different materials as long as a semi-transparent synthetic resin material containing a light scattering material is used.

The light emitting portion 21–25 is manufactured as follows, for instance. First, three transparent layers 21, 23 and 25 are formed beforehand. They are disposed parallel at approximately 1 mm intervals, for example. Then, the semi-transparent synthetic resin containing the scattering material is melted at a specific temperature and filled as a packing material into two intervals defined therebetween. Thereafter, they are solidified into one body. Any material can be used for the transparent body 21, 23, 25 if it has a good light conductivity. Any material can be used for the semi-transparent body 22, 24 if it contains a little light scattering material. Particularly, it is preferable that the transparent body 21, 23, 25 and the semi-transparent body 22, 24 have different refractive index.

For example, the transparent body 21, 23, 25 is formed of a transparent thermoplastic resin, while the semi-transparent body 22, 24 is formed of a thermoplastic resin containing a light scattering material. Otherwise, both of them may be made of a thermosetting resin. In either case, the diffusion layers 31, 32, 33 and 34 can be formed at the interfaces when integrating them.

Moreover, the LED array 40 has a printed board 41 of an elongate plate shape, a first LED lamp array 42, a second LED lamp array 43 and a joint resin 44. Many dome-shaped LED lamps are mounted on both lateral sides of the printed board 41 in two lines, thereby defining the first and second LED lamp arrays 42 and 43. The first LED lamp array 42 is faced to the lateral end surface of the semi-transparent body 24. The second LED lamp array 43 is faced to the lateral end surface of the semi-transparent body 22. Each LED lamp array 42, 43 is composed of red LED lamps, green LED lamps and blue LED lamps lined one after another in a successive manner. The joint resin 44 connects the LED array 40 integrally to the lateral end of the emitting portion 21–25, while sealing both LED lamp arrays 42 and 43. The joint resin 44 is made of an adhesive and joins the LED array 40 to the emitting portion 21–25. Thus, it is possible to effectively restrain the light of the LED lamp arrays 42 and 43 from reflecting at the end surfaces of the semi-transparent bodies 22 and 24.

The LED array 40 may substitute chip LEDs for the LED lamps as in the first embodiment. Moreover, the end surfaces of the semi-transparent bodies 22 and 24 may be displaced inward from the end surfaces of the transparent bodies 21, 23 and 25 as in the first embodiment, thereby defining dents. Then, the LEDs may be arranged in the dents.

In this case, it is also preferable to join the LED array 40 and the emitting portion 21–25 via the adhesive joint resin 44. Thus, it is possible to effectively prevent the light of the LED arranged in the dents from reflecting at the end surfaces of the semi-transparent bodies 22 and 24. Namely, the end of the semi-transparent body 22, 24 and the three primary colors of LED lamp array 42, 43 or LED chip array are joined by the adhesive 44 that has a light refractive index of the same value as or close value to that of the semi-transparent body 22, 24. Then, almost all of the light of the LED goes into the semi-transparent body 22, 24. In this case, it is possible to conduct the light emitted from the LED chip array 42, 43 efficiently to the semi-transparent body 22, 24. The rest of the LED light, which does not go into the end of the semi-transparent body 22, 24, enters the transparent body 21, 23, 25.

The present embodiment of planar light emitting device functions as the first embodiment and has advantageous effects as mentioned therein.

According to the first and second embodiments, the light entering the diffusion layers 14 and 15 or diffusion layers 31–34 makes them uniformly bright. Particularly, the diffusion layer 14, 15 or diffusion layer 31–34 enables the entire surface of the light emitter 10, 50 to uniformly emit light regardless of the distance from the light source. Therefore, it is possible to obtain uniform luminous intensity distribution even in a light emitting body having a complicated profile or outline. Thus, its applicable filed is enlarged. Moreover, the device has no combination of the diffusion material and prism as in the conventional art, so that there is no excessive attenuation. Therefore, natural and profound light emission is obtainable by the diffusion layer 14, 15 or 31–34. Furthermore, it is possible to set the light quantity entering the diffusion layer 14, 15, 31–34 as desired. As a result, it becomes easy to adjust the brightness.

Figure 7:
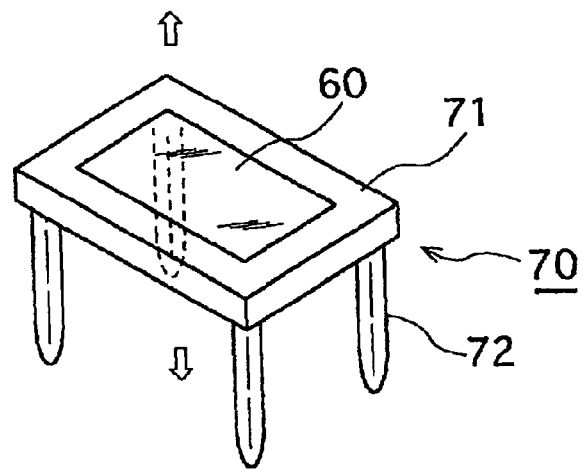
FIG. 7 is a perspective view showing a table embodying a planar light emitting device according to a third embodiment of the invention.

Next described is a third embodiment in which the planar light emitting device of the first or second embodiment is applied to a table. FIG. 7 shows the table embodying a planar light emitting device according to the third embodiment of the invention.

Referring to FIG. 7, the third embodiment uses a planar light emitting device 60 of a rectangular plate shape having the same structure as the light emitter 10, 50 of the first or second embodiment. The light emitter 60 emits light from its both thickness sides. A table 70 has a top board 71 and four legs 72. The light emitter 60 is fitted and secured in the top board 71. A light emitting portion of the light emitter 60 is exposed from both thickness sides of the top board 71. The light emitter 60 has a light source composed of an LED array and the like. The light source is embedded inside an outer peripheral portion of the top board 71, i.e. a frame.

In the above-structured table 70, the light emitter 60 emits light to illuminate an upper side and lower side of the top board 71 at once. Consequently, it can illuminate an object that is put on the upper surface of the top board 71. At the same time, it illuminates an underfoot area around the table. The table 70 is applicable to various types of tables including folding tables that is used in an automobile, train, airplane, etc. Of course, it can be applied to desks. Particularly, such table is suitable to create a unique atmosphere in a room such as a restaurant. Moreover, the table can be used as a planar light source for illuminating surroundings when put in a storage such as a warehouse.

Each of the above embodiments describes the planar light emitter 10, 50 of plate shape. However, it is possible to form a rod-shaped planar light emitting device by concentrically and integrally joining a tubular transparent body and tubular semi-transparent body. Here, the "rod-shaped" means or includes the one which has a light emitting surface extending two-dimensionally and circumferentially. Such "rod-shaped" light emitter is contained in a scope of the planar light emitter of the invention. Namely, the inventive planar light emitting device can be used as a rod-shaped sign pole, too, besides the board-shaped light emitting device such as the table having illuminating function. Moreover, each planar light emitting device of the above embodiments is usable as a backlight device for a liquid crystal panel or display board, etc. In any case, it works if the light emitting device is formed into a panel shape.

Figure 8:
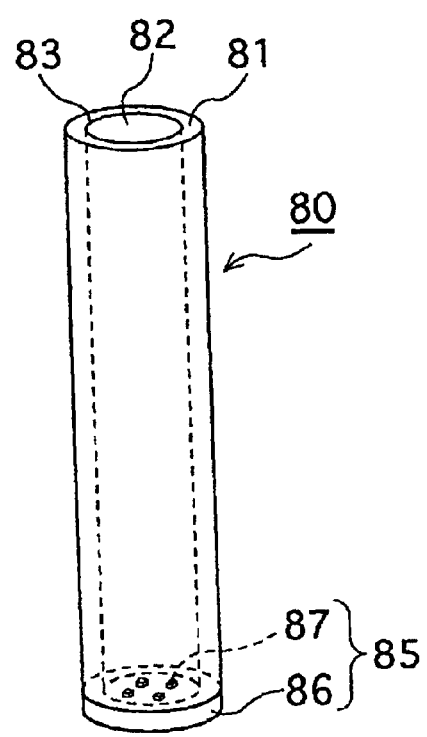
FIG. 8 is a perspective view showing a planar light emitting device in a rod shape according to a fourth embodiment of the invention.

Next described is a fourth embodiment that practices the invention into a rod-shaped planar light emitting device. FIG. 8 shows a planar light emitting device having a rod shape according to a fourth embodiment of the invention.

Referring to FIG. 8, a planar light emitter 80 is shaped into a two-layered cylinder that has a transparent body 81 and a semi-transparent body 82. The transparent body 81 has a hollow cylindrical shape and forms a surface layer at an outer circumference of the light emitter 80. The semi-transparent body 82 is filled inside the transparent body 81 and has a hollow cylindrical shape extending coaxially therewith. The transparent body 81 and semi-transparent body 82 are made of the same material as in the above embodiments. Thus, a diffusion layer 83 is formed between the transparent body 81 and the semi-transparent body 82. The diffusion layer 83 has a similar sea-islands structure to that of the diffusion layer 14, 15, 31, 32, 33, 34 in the above embodiments and functions in a similar way.

An LED 85 is fixed to one longitudinal end of a light transmitting portion, which is constituted by the transparent body 81 and semi-transparent body 82. The LED 85 has a printed board 86 of a disc shape corresponding to an end surface of the light emitting portion 81, 82. A plurality of chip LEDs 87 is mounted on a surface of the printed board 86 at a side of the light emitting portion 81, 82. The three primary colors of LEDs may be used as the chip LEDs 87 as in the above embodiments. Otherwise, a single color or two or more colors of chip LEDs may be used.

The light emitter 80 constructed as above has similar functions and effects as described in each of the above embodiments. Moreover, since the light emitter 80 has the rod shape, it can be used as a traffic control tool such as a sign pole. Furthermore, the light emitter 80 is excellent in design, since the light is emitted from the overall outer peripheral surface of the light emitting portion 81, 82 and becomes profound illumination. As a result, the inventive device is applicable to a variety of uses besides the traffic control tool, which are impossible in the conventional rod-shaped planar light emitting device. In addition, quantity of light entering the diffusion layer 83 can be adjusted as desired. Thus, it is easy to change brightness thereof.

The planar light emitting device can have three or more layers as long as it has a semi-transparent layer at least at a portion in cross section so as to form a diffusion layer. Moreover, the light emitting device may be shaped into a hollow cylinder, polygonal column or polygonal tube.

While the light source is constituted by the LED array 16, 40 made of the chip LEDs or LED lamps in each embodiment, the LED can be replaced with an incandescent lamp or fluorescent bulb or the like. However, if the light source is made of the LED as in the above embodiments, the device can be small-sized and power-saved. Moreover, either LED lamps or chip LEDs may be used as the LED. However, the device can be smaller size if the chip LEDs are used. The LED is not limited to one emitting the white color light. Any LED emitting a desired color light can be used. Moreover, the LED is not limited to the three primary colors of LEDs. A plurality of LEDs of a single color may be used to increase brightness. Otherwise, desired plural colors of LEDs may be used in combination therefor.

In particular, a desired light emission is obtainable depending on an atmosphere if the light source is composed of the LED array 16, 40. Furthermore, the LED array 16, 40 may be disposed on two or more sides of the planar light emitting device 10, 50 so as to augment lightness or obtain more uniform lightness distribution.

In addition, the light entering the diffusion layer 14, 15 or 31–34 of each above embodiment is repeatedly reflected therein so as to give brightness thereto. Consequently, the input light may preferably be a parallel light to the diffusion layer 14, 15, 31–34 so as not to enter directly therein.

Basically, the same synthetic resin material is used for the transparent body 11, 13, 21, 23, 25 and semi-transparent body 12, 22, 24 of each above embodiment. Here, the light travels straight or in a refracted manner in the semi-transparent body 12, 22, 24. Namely, part of the input light is cast on the scattering material and bent thereat, while the other input light travels straight. Consequently, if the light scattering material is much in the semi-transparent body 12, 22, 24, less light travels straight therein. Thus, it is possible that the light does not reach a portion distant from the LED and that such distant portion becomes dark. A mixing amount of the light scattering material is determined in consideration of such point.

The input light travels while reflected and diffused at the interface between the transparent body 11, 13, 21, 23, 25 and the diffusion layer 14, 15, 31–34. Namely, it is deduced that the light is reflected at a portion other than the islands, i.e. the sea in the sea-islands structure, in the same manner as a total reflection at an interface between different materials, while diffused at the islands. The quantity of light emitted from the transparent bodies 11, 13, 21, 23, 25 depends on the sea-islands structure provided at the interface. Accordingly, it is possible to decrease the scattering material, if it does not affect the sea-islands structure. The sea-islands structure is influenced not only by the amount of the scattering material but also forming conditions and so on.

As mentioned above, the materials for the transparent body 11, 13, 21, 23, 25 may be the transparent resin such as an acrylic resin, PMMA (polymethyl methacrylate). The materials for the semi-transparent body 12, 22, 24 may be made by mixing the transparent resin used for the transparent body 11, 13, 21, 23, 25 with the scattering material made of a transparent resin such as a silica or silicone. In this case, the refractive index varies depending on the material or medium of both the transparent resins. Thus, the semi-transparent body 12, 22, 24 looks like translucent.

The semi-transparent body 12, 22, 24 may be made of a film of a thickness 1 mm or less, since it is not used substantially for an optical path. Moreover, while the light source is provided on one side of the light emitting portion in the planar light emitting device of each above embodiment, it may be provided on two or more sides thereof. Namely, it works if the light source is disposed on at least one side of the planar light emitter 10, 50 in the invention.

Figure 9:
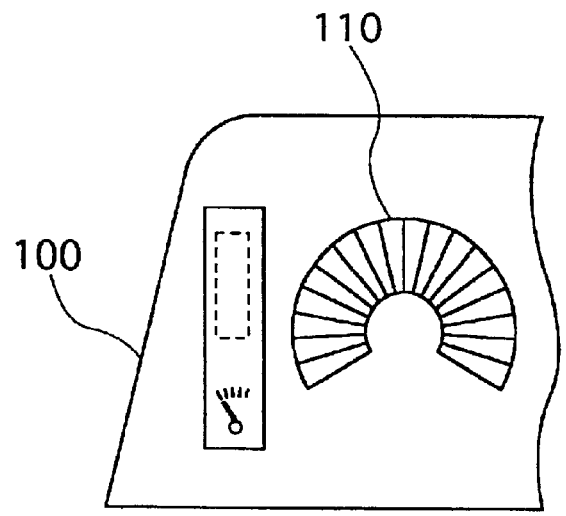
FIG. 9 is a plan view showing a speedometer embodying a planar light emitting device according to a fifth embodiment of the invention.
Figure 10:
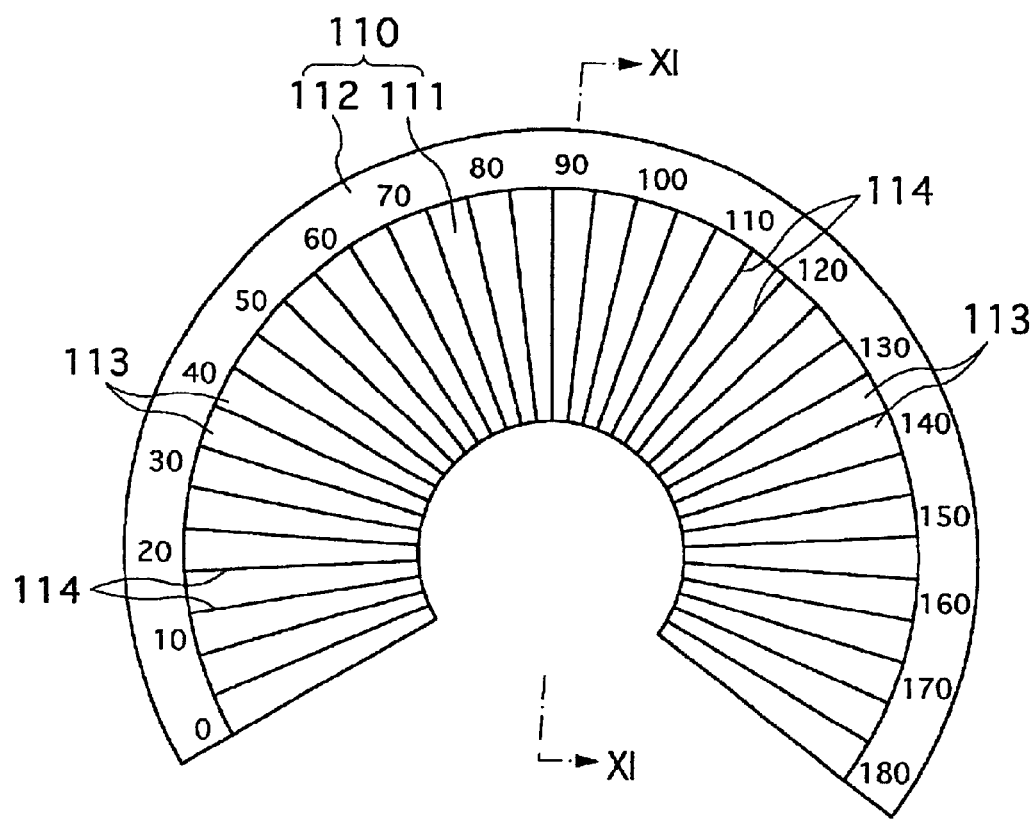
FIG. 10 is a plan view showing the speedometer of the fifth embodiment of the invention.
Figure 11:
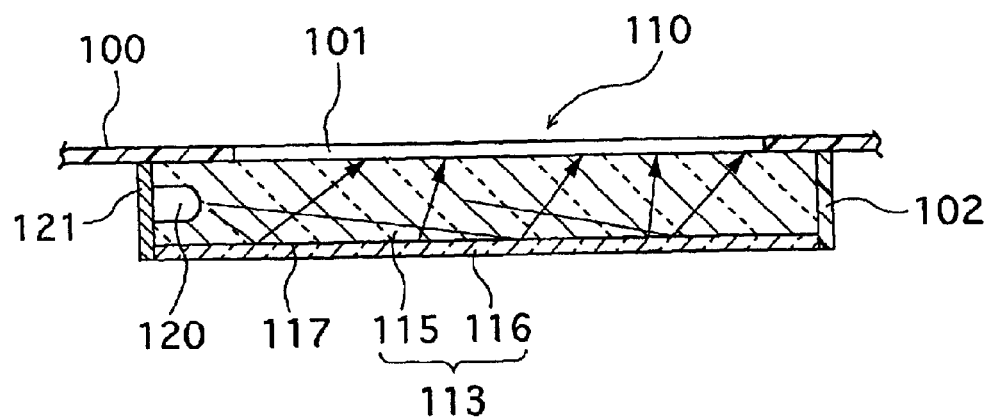
FIG. 11 is a cross sectional view taken along the line XI—XI of FIG. 10, showing the speedometer of the fifth embodiment of the invention, while cutting it in a radial direction.
Figure 12:
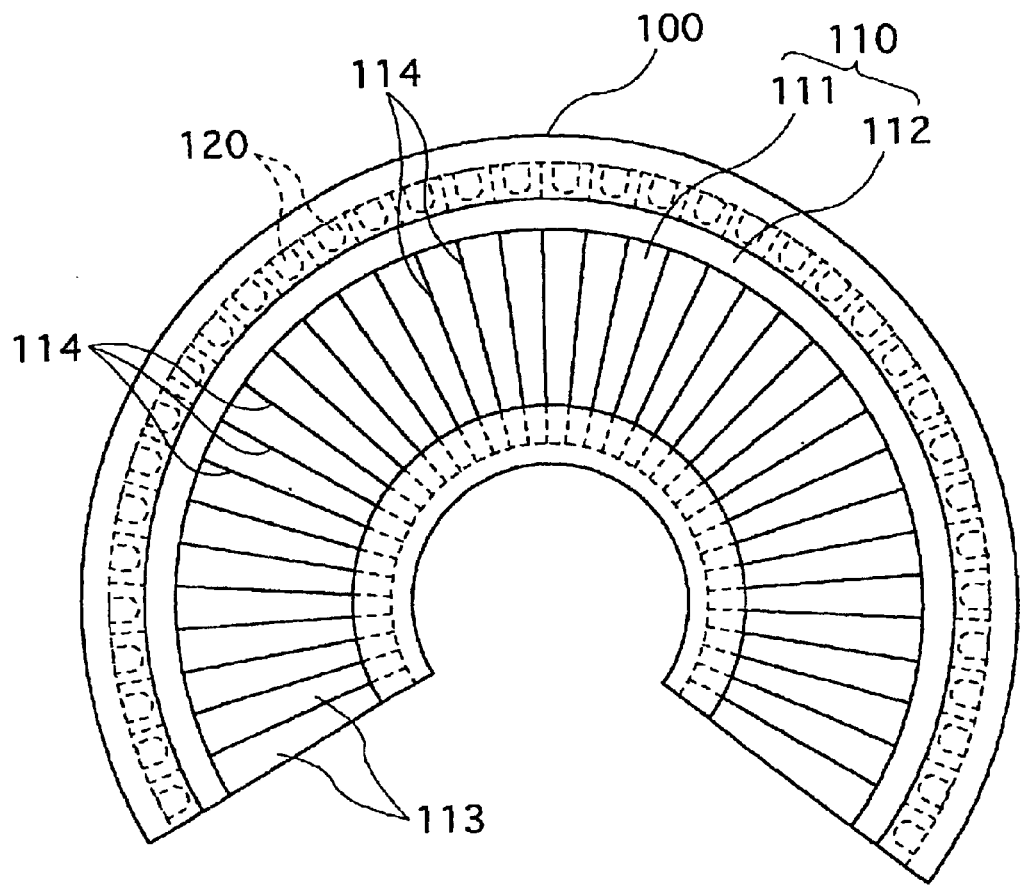
FIG. 12 is a plan view showing a main portion of the speedometer of the fifth embodiment of the invention.

FIG. 9 and FIG. 10 show a speedometer embodying a planar light emitting device according to a fifth embodiment of the invention. FIG. 11 shows the speedometer of FIG. 10, while cutting it along the line XI—XI. FIG. 12 shows a main portion of the speedometer of the fifth embodiment.

Referring to FIG. 9, the fifth embodiment of planar light emitting device is applied to a vehicle meter. The vehicle meter has a speedometer, tachometer, fuel gauge, temperature gauge and so on arranged on fixed positions of a meter panel 100. In particular, the present embodiment is applied to an analog speedometer that indicates a speed at 5 km/h intervals. The vehicle meter 110 has a pointer unit 111 of substantially a sector shape in plan view, which acts as a pointer, at a predetermined position of the meter panel 100. A scale plate 112 of the speedometer is disposed around an outer circumference of the pointer unit 111. Numbers indicating the speed are arranged on the scale plate 112 by engraving or printing.

Referring to FIG. 12, the pointer unit 111 is made up of many light conductor pieces 113 arranged planarly and closely to each other so as to form substantially the sector shape in plan view. Shielding films 114 are interposed between the adjacent light conductor pieces 113 so as to shut out the light therebetween. Each conductor piece 113 accommodates therein a single or plural LEDs, which are mounted on a printed board 121. The shielding films 114 may be provided only at an area corresponding to the pointer unit 111 so as not to shield the scale plate 112.

The conductor piece 113 has substantially a trapezoidal plan shape that has one longitudinal end or outer peripheral end wider than the other end or inner peripheral end. Then, many conductor pieces 113 are disposed closely to each other, while positioning the one end at the outer periphery side and the other end at the inner periphery side. Thus, the pointer unit 111 is formed into substantially the sector plan shape. The planar light emitting device described in each above embodiment is applied to each conductor piece 113.

Namely, as shown in FIG. 11, the conductor piece 113 has two-layered structure made of a transparent body 115 and semi-transparent body 116. The conductor piece 113 joins the semi-transparent body 116 to one thickness side or lower side in FIG. 11 of the transparent body 115. It has a light emitting surface at the opposite side or upper side. The transparent body 115 constitutes a light conductor portion. It is made of a transparent synthetic resin containing no light scattering material. The semi-transparent body 116 is made of a semi-transparent material containing a light scattering material. In this embodiment, a film 1 mm thick is used as the semi-transparent body 116.

As in the first embodiment, the conductor piece 113 may be formed of the transparent body 115 and the semi-transparent body 116 both made up of the thermoplastic resin, while joining the latter to the former by fusion. Otherwise, both the bodies 115 and 116 may be connected by an adhesive after they are formed. In either case, a diffusion layer 117 is formed at an interface by the fusion or adhesion when integrating both the resins. Even if either the transparent body 115 or semi-transparent body 116 is formed first, the diffusion layer 117 is provided at the interface by the fusion or adhesion when unifying both the resins. The diffusion layer 117 has the sea-islands structure in plan view, as in each above embodiment. It is formed evenly on an overall surface of the transparent body 115 and semi-transparent body 116.

A thickness of the diffusion layer 117 changes depending on the materials of the transparent body 115 and semi-transparent body 116 and a temperature in joining them. Generally, it is several microns to 70 microns. The semi-transparent body 116 functions in cooperation with the diffusion layer 117. Thus, it is possible to mix the light scattering material as less as possible. Where there is a question of leak of light from a bottom of the conductor piece 113, it is necessary to mix the scattering material as much as possible. Otherwise, a shielding film may be fitted to the bottom of the semi-transparent body 116 so as to shut off the light.

The meter panel 100 is made of a specific synthetic resin material that is opaque or has low transmittance. Referring to FIG. 11, the meter panel 100 has an opening 101 of substantially a sector shape formed by cutting out an area corresponding to the vehicle meter 110. The light emitting surface of the transparent body 115 is exposed from the opening 101. A shielding board 102 covers the inner end of the conductor piece 113.

The LED 120 is composed of red, green and blue LEDs, though each color of LED is not illustrated. They are embedded at one longitudinal end of each transparent body 115, while fixed by an adhesive thereto. In this case, the LED 120 may be provided as follows. For example, a fitting hole for accommodating the LED 120 is provided on nearly a center of an outer peripheral end of the transparent body 115. A desired number of the conductor pieces 113 are joined to form the sector shape, while interposing the shielding film 114 therebetween. Then, a flexible printed board 121 is fitted around the outer circumferential surface of the sector-shaped conductor pieces 113. At the same time, the LEDs mounted on the printed board 121 are inserted into the fitting holes. Thereafter, the LEDs 120 are joined integrally thereto by an adhesive.

FIG. 11 illustrates an example in which one dome-shaped LED lamp is disposed in one conductor piece 113, while the lamp accommodates therein the red, green and blue chip LEDs, for convenience sake. However, the red, green and blue chip LEDs may be arranged one by one in each conductor piece 113. Whether the dome-shaped LED is used or the chip LED is disposed, the red, green and blue LEDs can be provided one by one, namely three in total in one conductor piece 113. Otherwise, they may be provided twice or more times. A fitting slot may be formed on the outer end of the transparent body 115 so as to accommodate the three LEDs in the same space. In any case, each LED 120 is electrically connected to the flexible printed board 121 so that a prescribed color of LED is selectively lit by control. The LED 120 may be disposed on both sides of the conductor piece 113 or only one of the inner and outer ends.

In the present embodiment, the transparent body 115 and semi-transparent body 116 are positioned side by side. The printed board 121 is connected to the end of the conductor piece 113 so that the LED 120 is fitted into the end of the transparent body 115. However, the inventive device adopts a mechanism that the diffusion layer 117 and semi-transparent body 116 generate the light emission. Therefore, the light should be guided to either the transparent body 115 or the semi-transparent body 116 in which the incident light is harder to attenuate.

The above-structured vehicle meter 110 of the fifth embodiment operates as follows.

When a preset color of light is emitted from the LED 120, the light goes into the end of the transparent body 115. The incident light travels inside the transparent body 115, while entering the semi-transparent body 116. At this time, the islands or resin particles have irregular solid shapes.

Therefore, once the light has entered the semi-transparent body 116 from the transparent body 115, the light is never reflected directly at the islands toward the semi-transparent body 116 again. Thus, the light attenuates at the islands. Only the light reflecting at the sea surface of the diffusion layer 117 returns to the semi-transparent body 116. Consequently, the light entering the island resin makes the diffusion layer 117 bright. As a result, the diffusion layer 117 is prevented from partially lighting, thereby providing a uniform light emission. In this state, the entire surface of each conductor piece 113 uniformly emits light. Then, a profound light emission is obtained, since it is not generated at the outer surface of the transparent body 115.

Here, if the shielding films 114 are restricted to the area of the pointer unit 111, the light is shut off only at such area between the conductor pieces 113. Then, the light shield is not performed at the scale plate 112. Thus, the lighting conductor piece 113 simultaneously illuminates the scale plate 112 that is positioned near it. As a result, it is possible to illuminate the scale plate 112 utilizing the light of the conductor piece 113 for speed indication.

For example, the present embodiment of device lights only the LED 120 of the conductor piece 113 indicating a current speed in orange color. At the same time, it lights all the other conductor pieces 113 in blue, so that the pointer unit 111 is illuminated in blue at a portion corresponding to such conductor pieces 113. On the other hand, the pointer unit 112 is lit in orange at a portion corresponding to the current speed indicating conductor piece 113. Thus, it is possible for a driver to clearly recognize the current speed by the orange color emission different from the blue color emission of the other pieces 113.

The three primary colors of LEDs are used to represent a desired color including white by the conductor piece 113. However, the LED can be constituted by a single color LED or plural colors of LEDs. Moreover, it may be composed of one or more LED lamps or chip LEDs.

As described above, the light going into the transparent body 115 or semi-transparent body 116 of the conductor piece 113 generates uniform brightness in the diffusion layer 117. The inventors confirmed that the diffusion layer 117 was uniformly illuminated regardless of a distance from the light source when seen from the upper side of the conductor piece 113. The inventors also confirmed that, even if the transparent body 115 was thicker than the LED or made thinner as far as it did not affect the incident LED light quantity, there was no substantial change in light emission distribution on the surface of the conductor piece 113. Then, the luminous intensity distribution was kept uniform. Furthermore, the conductor piece 113 has the entire circumference cut into a perpendicular flat surface in the above embodiment. However, it was also confirmed that, even if the entire circumference was formed into a curved surface, there was no substantial change in the luminous intensity distribution.

The present embodiment is constructed such that the light emitted from the LED 120 enters the end of the transparent body 115. However, it is possible to make the light of the LED 120 enter the semi-transparent body 116. Moreover, it is possible to make the light enter the transparent body 115 and semi-transparent body 116 equally at the same time. Namely, it works if the light of the LED 120 goes into at least one of the transparent body 115 and semi-transparent body 116. Still, if the light of the LED 120 is sent only to the transparent body 115 as in the present embodiment, illumination becomes more efficient.

The fifth embodiment forms the diffusion layer 117 by one transparent layer 115 and one semi-transparent layer 116. However, plural diffusion layers 117 may be provided by joining plural transparent layers 115 and plural semi-transparent layers 116.

In the present embodiment, the conductor pieces 113 are divided at fixed intervals or a constant angle in the circumferential direction. Thus, they constitute many pointers of oblong trapezoidal plan shape at the surface side of the pointer unit 111. Each pointer defined by the conductor piece 113 indicates the speed in 5 km/h steps by dividing 10 km/h speed indicating scale in two.

Referring to FIG. 12, the LEDs 120 are disposed on all conductor pieces 113, thereby to be provided corresponding to each pointer. Therefore, the three primary colors of LEDs 120 are arranged in the same number as the pointers along the outer circumference of the pointer unit 111, which is formed by many conductor pieces 113. Then, they define a red LED group, green LED group and blue LED group. As mentioned above, each LED 120 can be lit individually, thereby selectively illuminating a corresponding pointer for speed indication.

The fifth embodiment of vehicle meter has the diffusion layer 117 arranged on the bottom or lower surface of the transparent body 115. Then, the lower surface of the transparent body 115 or diffusion layer 117 radiates the light from the LED 120 toward the upper surface of the transparent body 115. Actually, the conductor piece 113 is illuminated by the light emission of the diffusion layer 117. However, it can be said that the lower surface of the transparent body 115 substantially acts as a reflecting surface.

If the conductor piece 113 as the planar light emitting device of the fifth embodiment is practiced into a pointer unit of a speedometer or the like, for example, it has a profound light emission. Then, the illumination is soft to the eyes of a user, thereby improving visibility to a large extent. In particular, the light from the LED 120 can be scattered by the diffusion layer 117 at high efficiency. Therefore, it is unnecessary to provide a reflecting surface such as a white coating on the rear surface or lower surface of the transparent body 115. Moreover, the manufacturing costs become lower as compared with the case in which a prism is provided on the rear surface of the transparent body 115.

A driver can recognize the car speed by looking at the conductor piece 113 that acts as a pointer and lights at a specific angular position. Thus, the fifth embodiment eliminates a pointer and a pointer drive mechanism as conventional mechanical components. As a result, it is possible to reduce conventional mechanical parts and improve quality of products such as durability, reliability and indication accuracy. Moreover, the vehicle meter can be thin and increase possibility in designing. Furthermore, it can enlarge the distance from the meter to the eye position of the driver. In addition, the pointer unit 111 has the sector shape, so that the vehicle meter can be used with similar atmosphere to the conventional analog meter. Therefore, the vehicle meter does not make strange impression on the user, while improving the design.

In particular, the conductor piece 113 is made of the inventive planar light emitter, so that it can be lit in a desired color. Moreover, the color of the pointer can be selected appropriately in accordance with various conditions, e.g. what taste in colors the user has, how it calls attention of the user, and how the user reacts to the color. Furthermore, the light of the conductor piece 113 can be guided to the scale plate 112. Thus, the color of the scale plate or scale can be also selected appropriately in accordance with various conditions, e.g. what taste in colors the user has, how it calls attention of the user, and how the user reacts to the color.

While the pointer unit 111 and scale plate 112 are formed on the same conductor piece 113 in the present embodiment, the scale plate 112 may be constituted by another planar light emitter of ring shape. Such planar light emitter are to be composed of the same transparent body as the transparent body 115 and the semi-transparent body as the semi-transparent body 116.

A sixth embodiment of planar light emitting device is described hereafter.

Figure 13:
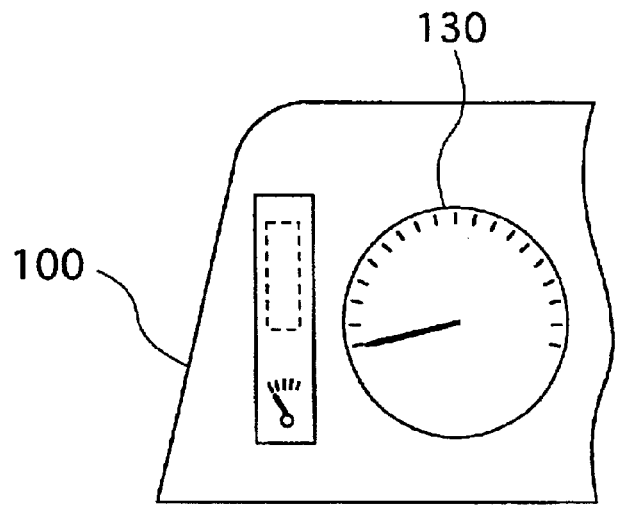
FIG. 13 is a plan view showing a speedometer embodying a planar light emitting device according to a sixth embodiment of the invention.
Figure 14:
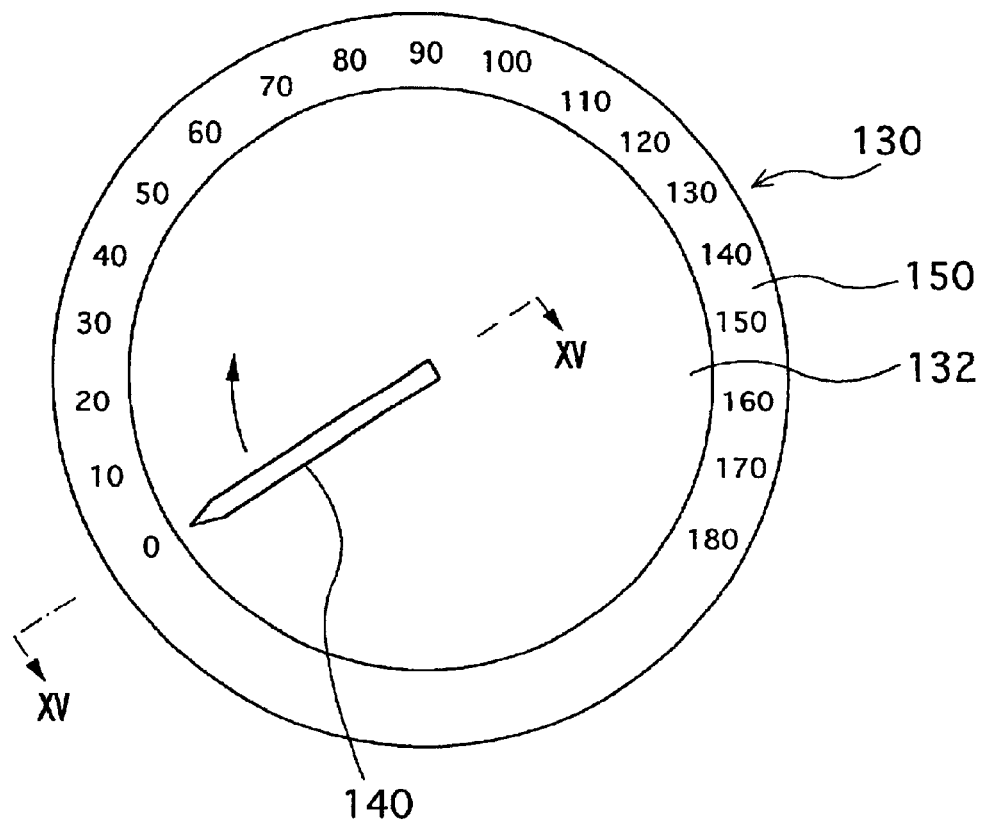
FIG. 14 is a plan view showing the speedometer of the sixth embodiment of the invention.
Figure 15:
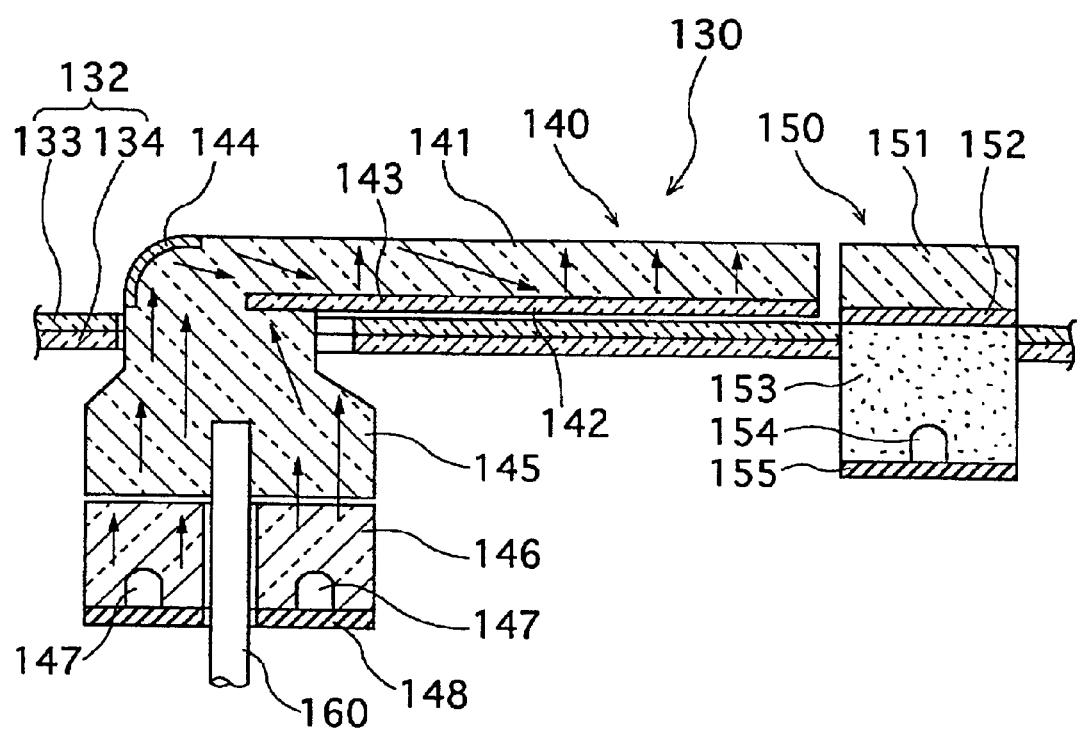
FIG. 15 is a cross sectional view taken along the line XV—XV of FIG. 14, showing the speedometer of the sixth embodiment of the invention, while cutting it in a radial direction.

FIG. 13 and FIG. 14 show a speedometer embodying a planar light emitting device according to the sixth embodiment of the invention. FIG. 15 shows the speedometer of FIG. 14, while cutting it along the line XV—XV.

Referring to FIG. 13, the present embodiment is applied to a vehicle meter similar to that of the fifth embodiment, particularly to an analog speedometer using a pointer. Referring to FIG. 14, the vehicle meter 130 has a pointer 140 at a predetermined position of the meter panel 100. A scale plate 150 of the speedometer is disposed around an outer circumference of the pointer 140. Numbers indicating the speed are arranged on a mask by engraving or printing, thereby forming a scale for the scale plate 150. A planar light emitter 132 is disposed inside the scale plate 150. The light emitter 132 and scale plate 150 constitute a dial of the speedometer. Referring to FIG. 15, the light emitter 132 is made up of a transparent body 133 and semi-transparent body 134. The transparent body 133 is formed of a transparent synthetic resin layer containing no light scattering material. One thickness side or lower surface thereof defines a light reflecting surface, while the other thickness side or upper surface defining a light emitting surface. The semi-transparent body 134 is joined to the lower surface of the transparent body 133. It is formed of a semi-transparent synthetic resin layer containing a light scattering material. The light emitter 132 is planarly lit by the light sent from LEDs that emit plural colors of light such as red, green and blue, though not shown. It is possible to set the color of the planarly illuminated light emitter 132 in a desired one.

The scale plate 150 has a ring shape. It has an upper ring 151 and a lower ring 153. The upper ring 151 is made of a transparent synthetic resin containing no light scattering material. Its lower surface defines a light reflecting surface, while an upper surface thereof defining a light emitting surface. The lower ring 153 is made of a semi-transparent synthetic resin containing a light scattering material. It is joined to the upper ring 151. A mask 152 is disposed between the upper ring 151 and lower ring 153. The mask 152 is provided with the numbers for speed indication. LEDs 154 are disposed at a lower side of the lower ring 153 so as to send plural colors of light including red, green and blue therein. The LEDs 154 are mounted on a printed board 155. These members 151 to 155 are unified. A light shielding film not shown is joined to inner and outer peripheral surfaces of the scale plate 150 so that the light is prevented from leaking outward.

The scale plate 150 serves for speed indication via the mask 152, while illuminated by the red, green or blue light selectively emitted from the LEDs 154. It is possible to control the lighting of the LEDs 154 so that they illuminate the scale plate 150 in a desired color of light.

The pointer 140 is formed into substantially an oblong shape with the outer end portion narrower than the inner end portion so as to taper to a point in plan view or when seen from the upper side. The pointer 140 is made up of a planar light emitter that is composed of a transparent body 141 and a semi-transparent body 142. The transparent body 141 is formed of a transparent synthetic resin containing no light scattering material. Its lower surface defines a light reflecting surface, while an upper surface thereof defining a light emitting surface. The semi-transparent body 142 is joined to the lower surface of the transparent body 141. It is formed of a semi-transparent synthetic resin containing a light scattering material.

The transparent body 141 is made of a thermoplastic resin, while the semi-transparent body 142 is made into a film of a thermoplastic resin. The pointer 140 is formed by joining such semi-transparent body 142 to the transparent body 141 by an adhesive. A diffusion layer 143 is formed from the adhesive at an interface between both resins at the time of integrating. Whether either the transparent body 141 or semi-transparent body 142 is formed first, the diffusion layer 143 is formed at the interface when unifying both the resins. The light scattering material is contained in the semi-transparent body 142 in order to form the diffusion layer 143. Therefore, the mixing amount of the scattering material can be as less as possible. The diffusion layer 143 has the sea-islands structure as in the above embodiments.

A reflector 144 with substantially L cross section is embedded in a base end of the pointer 140. A light receiving piece 145 is integrally formed on the lower end of the pointer 140. The light receiving piece 145 is shaped into a solid cylinder of substantially reversed T cross section. The light receiving piece 145 is made of the same material as the transparent body 141 and formed integrally thereto. An output shaft 160 of a drive unit of the speedometer has an upper end portion fixed to the center of the light receiving piece 145 by an adhesive.

A light source piece 146 of a hollow cylindrical shape is secured around the output shaft 160 below the light receiving piece 145. The light source piece 146 is made of a transparent synthetic resin layer containing no light scattering material. A lower surface thereof defines a light incident surface, while an upper surface defining a light emitting surface. Red, green and blue LEDs 147 are joined to a lower part of the light source piece 146, while mounted on a printed board 148.

When the LEDs 147 are lit in a specific color, such light is sent from the light source piece 146 into the light receiving piece 145. The incident light goes toward the reflector 144 from the light receiving piece 145, thereby reflecting at the reflector 144. The reflected light travels from the inner end to the outer end of the transparent body 141, thereby entering the semi-transparent body 142. At this time, the light goes into the semi-transparent body 142 from the transparent body 141 thereby to be diffused uniformly by the diffusion layer 143 as in the above embodiments. Therefore, it is prevented that luminance becomes partially large. Consequently, the overall upper surface of the pointer 140 is evenly illuminated. Moreover, since the brightness is generated at the diffusion layer 143, profound light emission is obtainable.

For example, the vehicle meter 130 lights the LED 154 in blue so as to illuminate the scale plate 150 in blue. Moreover, it lights the LED 147 in orange so as to illuminate the pointer 140 in orange. Then, a specific speed is indicated by the orange pointer 140 that is contrasted with the blue scale plate 150. Thus, a user can recognize a current speed easily.

As mentioned above, the light entering the transparent body 141 or semi-transparent body 142 generates uniform brightness in the diffusion layer 143. The inventors confirmed that the overall surface of the pointer 140 was uniformly lit due to the diffusion layer 143 regardless of a distance from the light source. The inventors also confirmed that, even if the transparent body 141 was thicker than the LED 147 or made thinner as far as it did not affect the incident LED light quantity, there was no substantial change in light emission distribution on the surface of the pointer 140. Then, it was possible to obtain uniform luminous intensity distribution. Furthermore, it was also confirmed that, whether the entire circumference of the pointer 140 was formed into a perpendicular flat surface or curved surface, there was no substantial change in the luminous intensity distribution.

The present embodiment is constructed such that the light emitted from the LED 147 enters the inner end of the transparent body 141. However, it is possible to make the light of the LED 147 enter the semi-transparent body 142. Moreover, it is possible to make the light enter the transparent body 141 and semi-transparent body 142 equally at the same time. Namely, it works if the light of the LED 147 goes into at least one of the transparent body 141 and semi-transparent body 142. Still, if the light of the LED 147 is sent only to the transparent body 141 as in the present embodiment, illumination becomes more efficient.

The pointer 140 forms the diffusion layer 143 by one transparent layer 141 and one semi-transparent layer 142. However, plural diffusion layers 143 may be provided by joining plural transparent layers 141 and plural semi-transparent layers 142.

The scale plate 150 joins the transparent body 151 and the semi-transparent body 153 via the mask 152. However, it may be made of a planar light emitter that directly joins the transparent body 151 and semi-transparent body 153, thereby eliminating the mask 152. In this case, the numbers for speed indication are engraved on the front or upper surface of the transparent body 151.

The sixth embodiment of planar light emitter is practiced into the pointer 140 of the speedometer or the like, for example, so that it can provide soft illumination to the eyes of the user. Thus, it is possible to improve visibility to a large extent. In particular, the light from the LED 147 can be scattered by the diffusion layer 143 at high efficiency. Therefore, it is unnecessary to provide a reflecting surface such as a white coating on the rear surface of the transparent body 141. Moreover, the manufacturing costs become lower as compared with the case in which a prism is provided on the rear surface of the transparent body 141. The driver can recognize the car speed by looking at the pointer 140 that lights at a specific angular position. The vehicle meter can be thin and increase possibility in designing. Furthermore, it can enlarge the distance from the meter to the eye position of the driver. In addition, the present embodiment applies the planar light emitter to the pointer 140, so that it is also usable as a pointer in a conventional vehicle meter.

In particular, the pointer 140 is made of the inventive planar light emitter, so that the pointer 140 can be lit in a desired color. Moreover, the color of the pointer 140 can be chosen in accordance with various conditions, e.g. what taste in colors the user has, how it calls attention of the user, and how the user reacts to the color. Furthermore, the scale plate 150 can be formed of the inventive planar light emitter in addition to the pointer 140, so that the same effects are obtainable in the scale plate 150, too. In this case, it is usable as a dial or a scale plate of conventional vehicle meters. The LEDs 120, 147 of the vehicle meters of the fifth and sixth embodiments can be a single color or two or more colors. The color can be set as desired.

Figure 16:
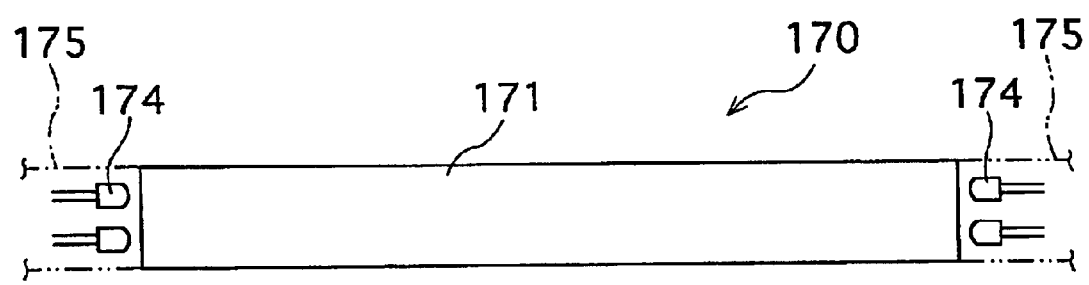
FIG. 16 is a plan view showing a side step for a vehicle embodying a planar light emitting device according to a seventh embodiment of the invention.
Figure 17:
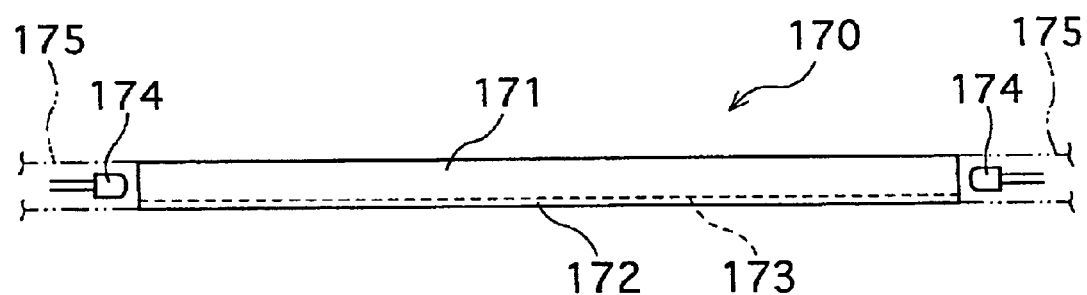
FIG. 17 is a side view showing the side step of the seventh embodiment of the invention.

FIG. 16 and FIG. 17 show a side step for a vehicle embodying a planar light emitting device according to a seventh embodiment of the invention.

The planar light emitter of the seventh embodiment is applied to the side step disposed on a lower end of a door opening of a vehicle such as an automobile. The side step has a planar light emitter 170 shaped into an elongate rectangular flat plate. The planar light emitter 170 constitutes a main part of the side step. It normally has a length of approximately 700 to 1000 mm at the longest. The planar light emitter 170 has a two-layered structure of a transparent body 171 and a semi-transparent body containing a light scattering material. The transparent body 171 and semi-transparent body 172 are respectively formed of the same material and in the same manner as in the above embodiments, thereby joined to each other. A diffusion layer 173 having the aforementioned sea-islands structure is formed between the transparent body 171 and semi-transparent body 172. As in the above embodiments, the planar light emitter 170 may have three or more layers, thereby providing two or more diffusion layers 173.

Plural LEDs 174 are arranged in a faced manner to both longitudinal ends of the planar light emitter 170, respectively. The LEDs 174 are provided inside a light source piece 175 made of a sealing resin, for example. The LEDs 174 have such directivity as to emit light only into the longitudinal end surface of the light emitter 170. Any LED that is able to emit one or more desired colors may be used as the LEDs 174 as in the above embodiments. It works if the light from the LEDs 174 is emitted into at least one of the transparent body 171 and semi-transparent body 172 as long as it is possible to obtain a uniform luminous intensity distribution and luminance as desired. The side step may have a metal frame fitted around the planar light emitter 170 to reinforce it. Namely, so far as it is able to emit light from the light emitter 170, any other structure can be adopted.

The side step in the seventh embodiment is secured to the lower end of the door opening of the vehicle in such a manner that the transparent body 171 is positioned at the upper side. The light emission of the LEDs 174 is controlled so that the upper surface of the light emitter 170 sends out light. Then, the upper surface of the side step is illuminated, thereby performing expected illumination effects. At this time, as described in each above embodiment, the entire surface of the transparent body 171 is uniformly lit. Moreover, the diffusion layer 173 defines a lighting part, thereby to provide a profound light emission.

Figure 18:
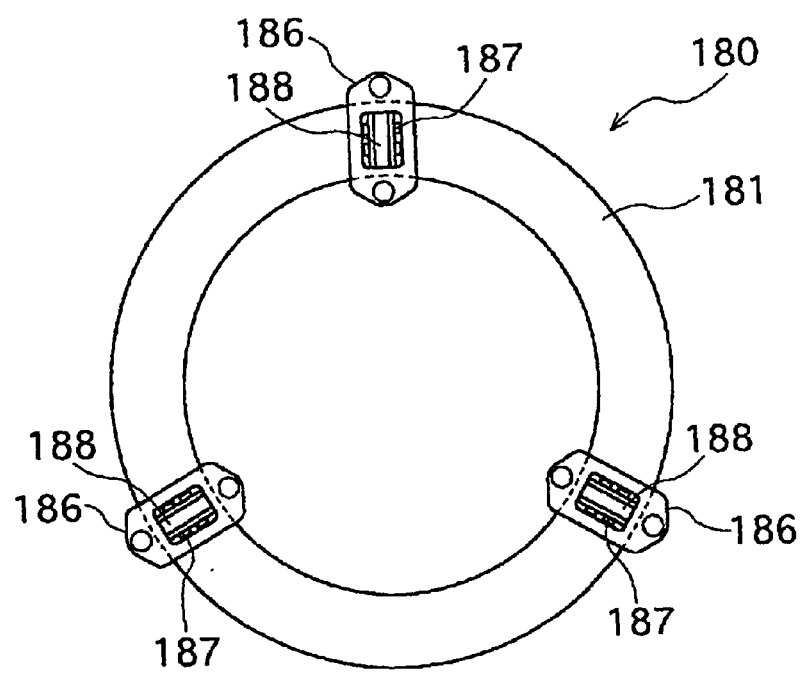
FIG. 18 is a plan view showing a sound illumination device embodying a planar light emitting device according to an eighth embodiment of the invention.
Figure 19:
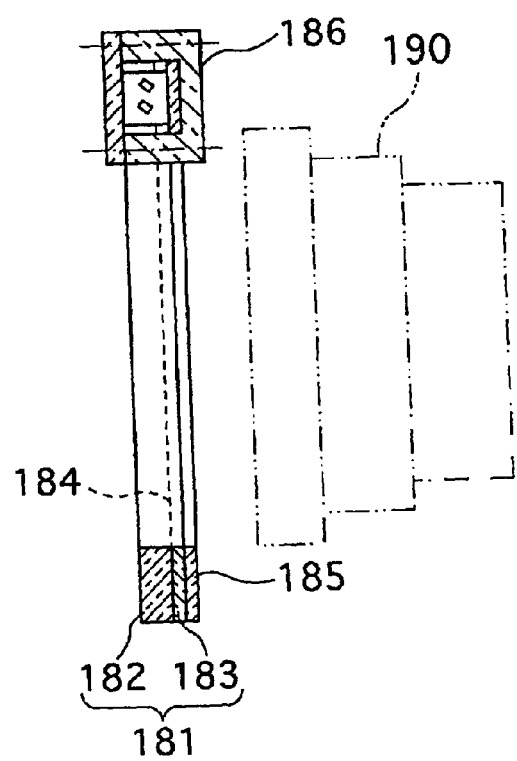
FIG. 19 is a cross sectional view showing the sound illumination device of the eighth embodiment.

FIG. 18 and FIG. 19 show a sound illumination device embodying a planar light emitting device according to an eighth embodiment of the invention.

The planar light emitter of the eighth embodiment is applied to the sound illumination device for shock sounds that is provided around a speaker. The sound illumination device is known commonly as a sound illumination lamp and the like that normally uses a neon glow lamp. In such device, preset colors of light is turned on or flashed on and off in accordance with sounds output from the speaker. It is used for shop demonstration, for example. The present embodiment of sound illumination device 180 has a ring-shaped light emitter 181. The light emitter 181 is shaped into a ring of a larger diameter than that of the speaker. The light emitter 181 has a two-layered structure made of a transparent body 182 and a semi-transparent body 183 containing a light scattering material. The transparent body 182 and semi-transparent body 183 are formed of the same material and in the same manner as in each above embodiment, thereby joined to each other. A diffusion layer 184 having the aforementioned sea-islands structure is formed between the transparent body 182 and semi-transparent body 183. A white board 185 is fixed integrally to one surface of the semi-transparent body 183 away from the transparent body 182 by screws or the like. As in the above embodiments, the light emitter 181 may have three or more layers, thereby providing two or more diffusion layers 184.

A light source piece 186 is secured to predetermined positions of the light emitter 181 at constant angles along its circumference. The light source piece 186 has a hollow at the inside. Plural LEDs 187 are arranged in the hollow, while mounted on a printed board 188. The LEDs 174 are mounted on both sides of each of the printed boards 188 so as to emit light toward opposite directions therefrom. Any LED that is able to emit one or more desired colors may be used as the LEDs 187 as in the above embodiments. It works if the light from the LEDs 187 is emitted into at least one of the transparent body 182 and semi-transparent body 183 as long as it is possible to obtain a uniform luminous intensity distribution and luminance as desired.

The sound illumination device of the eighth embodiment is disposed in front of the speaker 190 and in a coaxial position therewith. The light emission of the LEDs 187 is controlled so as to emit light in predetermined colors or in preset emission patterns in accordance with sounds of the speaker 190. Then, the light emitter 181 is illuminated, thereby performing expected illumination effects. At this time, as described in each above embodiment, the entire surface of the transparent body 182 is uniformly lit. Moreover, the diffusion layer 184 defines a lighting part, thereby to provide a profound light emission.

Figure 20:
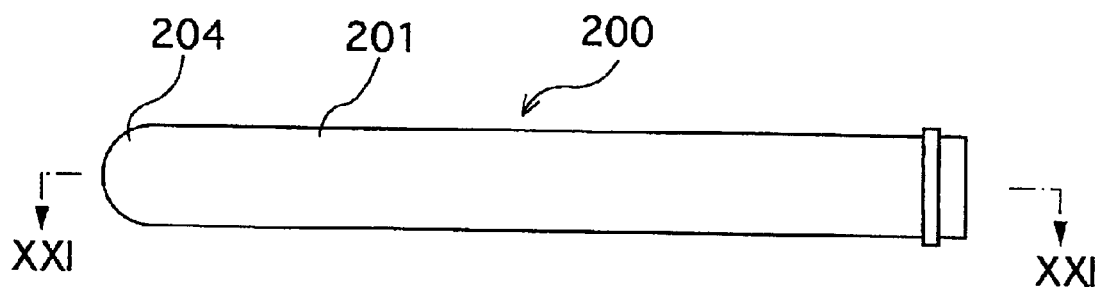
FIG. 20 is a plan view showing a stick lamp embodying a planar light emitting device according to a ninth embodiment of the invention.
Figure 21:
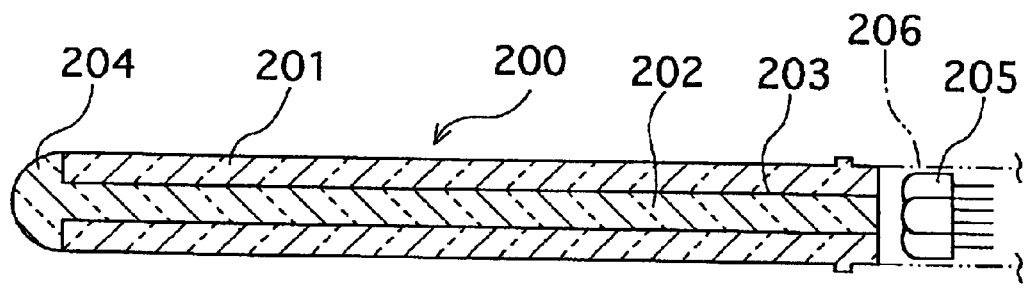
FIG. 21 is a cross sectional view taken along the line XXI—XXI of FIG. 20.

FIG. 20 and FIG. 21 show a stick lamp embodying a planar light emitting device according to a ninth embodiment of the invention.

The planar light emitter of the ninth embodiment is applied to the stick lamp 200 as a rod-shaped planar light emitter as in the fourth embodiment. The stick lamp 200 has a two-layered structure shaped into a solid cylinder. The planar light emitter 200 has a transparent body 201 and a semi-transparent body 202. The transparent body 201 has a hollow cylindrical shape and constitutes a surface layer at the outer periphery of the stick lamp 200. The semi-transparent body 202 is filled in the transparent body 201. The semi-transparent body 202 has a solid cylindrical shape extending coaxially with the transparent body 201. One longitudinal end of the semi-transparent body 202 is formed into a semi-spherical shape with the same diameter as that of the transparent body 201, thereby constituting a leading end portion of the stick lamp 200. The material of the transparent body 201 and semi-transparent body 202 are the same as those of the above embodiments. A diffusion layer 203 having the aforementioned sea-islands structure is formed between the transparent body 201 and semi-transparent body 202. As in the above embodiments, the stick lamp 200 may have three or more layers, thereby providing two or more diffusion layers 203.

Plural LEDs 205 are arranged in a faced manner to a base end surface of the stick lamp 200. The LEDs 205 are provided inside a light source piece 206 made of a sealing resin, for example. The LEDs 205 have such directivity as to emit light only into the base end surface of the stick lamp 200. The LEDs 205 are composed of three primary colors of dome-shaped LED lamps. However, any LED that is able to emit one or more desired colors may be used as the LEDs 205 as in the above embodiments. It works if the light from the LEDs 205 is emitted into at least one of the transparent body 201 and semi-transparent body 202 as long as it is possible to obtain a uniform luminous intensity distribution and luminance as desired.

In the ninth embodiment, the light emission of the LEDs 205 is controlled appropriately so that the outer surface of the stick lamp 200 sends out light. Then, a desired illumination is obtained with expected illumination effects. At this time, as described in each above embodiment, the entire surface of the transparent body 201 is uniformly lit. Moreover, the diffusion layer 203 defines a lighting part, thereby to provide a profound light emission. Furthermore, the semi-spherical portion of the semi-transparent body 202 emits light in a smoked manner at the leading end of the stick lamp 200, thereby giving unique illumination effects.

The preferred embodiments described herein are illustrative and not restrictive, the scope of the invention being indicated in the appended claims and all variations which come within the meaning of the claims are intended to be embraced therein.

What is claimed is:

1. A planar light emitting device comprising:
    a transparent body having a transparent synthetic resin layer containing no light scattering material;
    a semi-transparent body having a semi-transparent synthetic resin layer containing a light scattering material;
    a diffusion layer, the transparent body and the semi-transparent body being joined to form the diffusion layer therebetween;
    at least the transparent body, the semi-transparent body and the diffusion layer defining a planar light emitter; and
    a light source disposed at least at one side of the planar light emitter,
        wherein the diffusion layer includes a sea-islands structure, the sea-islands structure having a plurality of solid shapes, and the light source comprises a light-emitting diode (LED).

2. The planar light emitting device according to claim 1, wherein the planar light emitter comprises a flat shape.

* * * * *